(12) United States Patent
Heer et al.

(10) Patent No.: US 8,367,188 B2
(45) Date of Patent: Feb. 5, 2013

(54) AUTHENTICITY MARK IN THE FORM OF LUMINESCENT SUBSTANCES

(75) Inventors: Stephan Heer, München (DE); Thomas Giering, Kirchseeon (DE); Kai Uwe Stock, Grünwald (DE); Gregor Grauvogl, Oberhaching (DE)

(73) Assignee: Giesecke & Devrient GmbH, Munich (DE)

( * ) Notice: Subject to any disclaimer, the term of this patent is extended or adjusted under 35 U.S.C. 154(b) by 425 days.

(21) Appl. No.: 12/445,038

(22) PCT Filed: Oct. 9, 2007

(86) PCT No.: PCT/EP2007/008773
§ 371 (c)(1),
(2), (4) Date: Apr. 9, 2009

(87) PCT Pub. No.: WO2008/043522
PCT Pub. Date: Apr. 17, 2008

(65) Prior Publication Data
US 2010/0026991 A1 Feb. 4, 2010

(30) Foreign Application Priority Data
Oct. 10, 2006 (DE) .......................... 10 2006 047 851

(51) Int. Cl.
*G06K 19/14* (2006.01)
(52) U.S. Cl. ...... 428/195.1; 356/71; 427/7; 252/301.4 R
(58) Field of Classification Search ................ 428/195.1
See application file for complete search history.

(56) References Cited

U.S. PATENT DOCUMENTS

| | | | | |
|---|---|---|---|---|
| 4,833,311 | A | * | 5/1989 | Jalon ............................. 235/491 |
| 6,344,261 | B1 | * | 2/2002 | Kaule et al. ................. 428/195.1 |
| 2004/0105962 | A1 | * | 6/2004 | Giering et al. ............. 428/195.1 |

FOREIGN PATENT DOCUMENTS

| | | |
|---|---|---|
| DE | 3121491 | 5/1982 |
| DE | 19804021 | 8/1999 |
| EP | 1370424 | 5/2002 |
| GB | 2258660 | 2/1993 |
| WO | 9938700 | 8/1999 |
| WO | 02070279 | 9/2002 |
| WO | 2005036478 | 4/2005 |
| WO | 2005036479 | 4/2005 |
| WO | 2006005498 | 1/2006 |
| WO | 2006024530 | 3/2006 |

OTHER PUBLICATIONS

Search Report of German Patent and Trademark Office regarding German patent application No. 10 2006 047 851.7, Oct. 10, 2006.
International Search Report for PCT/EP2007/008773, Mar. 5, 2008.

* cited by examiner

*Primary Examiner* — Mark Ruthkosky
*Assistant Examiner* — Ian Rummel
(74) *Attorney, Agent, or Firm* — Bacon & Thomas, PLLC

(57) ABSTRACT

A printed document of value has an authenticity feature in the form of at least two luminescent substances on the basis of host lattices which are doped with one or a plurality of ions. By systematically changing the host lattices and/or ions of the $(nd)^3$ electron configuration a specific setting of the luminescence properties of luminescent substances is possible, the combination of which permits a multiplicity of complex new authenticity features.

25 Claims, 3 Drawing Sheets

AUTHENTICITY MARK IN THE FORM OF LUMINESCENT SUBSTANCES

FIELD OF THE INVENTION

The invention relates to a printed document of value having an authenticity feature in the form of at least two luminescent substances on the basis of host lattices which are doped with one or a plurality of ions.

BACKGROUND

In the context of this invention the term "document of value" refers to bank notes, checks, share certificates, tokens, ID documents, credit cards, passports and other documents as well as labels, seals, packagings or other elements for the product protection.

The protection of documents of value against forgery by means of luminescent substances has already been known for a long time. The use of transition metals and rare earth metals as luminescent ions has already been discussed. Such ions have the advantage that they, after appropriate excitation, show one or a plurality of characteristic narrow-band luminescences which facilitate a reliable detection and the delimitation against other spectra. Combinations of transition metals and/or rare earth metals have also been already discussed. Such substances have the advantage that, in addition to the above-mentioned luminescences, so-called energy transfer processes are observed which can lead to more complicated spectra. In such energy transfer processes an ion can transfer its energy to another ion and then the spectra can consist of a plurality of narrow-band lines which are characteristic for the two ions.

An example of a known luminescent substance is $Al_2O_3$ doped with $Cr^{3+}$. This substance is also referred to as ruby. After excitation in the visible spectral range the ruby luminesces in a narrow-band fashion.

DE 198 04 021 A1 describes a document of value with at least one authenticity feature in the form of a luminescent substance on the basis of doped host lattices. These are authenticity features, which are based on an energy transfer step from $Cr^{3+}$ to a rare earth ion. The luminescence then is observed with the rare earth ions.

EP 1 370 424 B1 describes a printed document of value having at least one authenticity feature in the form of a luminescent substance on the basis of host lattices which are doped with ions of the $(3d)^2$ electron configuration.

But luminescent substances, which consist of a host lattice doped with ions and are suitable for the protection of documents of value, in general are limited in their number.

Substances luminescent in a narrow-band fashion which are based on transition metals and are suitable for the protection of documents of value are especially limited in their number. Moreover, they have the disadvantage that these luminescences have a long lifetime.

Luminescent substances which are based on rare earth metals have the disadvantage that the spectral position of the narrow-band luminescences can be influenced only very poorly by the host lattice. Moreover, most of the substances can be excited only very inefficiently.

SUMMARY

Starting out from this prior art the invention is based on the object to increase the number of substances which are suitable as authenticity marking for documents of value and in particular to provide new authenticity features which differ from documents of value having hitherto known authenticity features by their characteristic properties.

The invention is based on the finding, that a systematic change of the host lattice and/or of ions of the $(nd)^3$ electron configuration allows a specific setting of the luminescence properties of such luminescent substances and their combination permits a multiplicity of complex new authenticity features.

For example, the luminescence properties of $(3d)^3$ ions can be described by the following three parameters: the ligand field parameter Dq, the Racah parameter B and the effective atomic number $Z^{e\!f\!f}$.

The ligand field parameter Dq describes the splitting of the 3d orbitals in an octahedral ligand field. The dimension of this splitting depends on the nature of the ligands. The shift of the electronic states here follows the so-called Tanabe-Sugano diagrams. With a weak ligand field the luminescent state is described with the symmetry term symbol $^4T_2$ and in this case a wide luminescence with a relatively short lifetime is observed, because this is a spin-allowed transition. The spectral position of this luminescence can be strongly shifted by a suitable choice of the host lattice. With a characteristic greater value of the ligand field parameter Dq there takes place a change of the lowest electronic state from $^4T_2$ to $^2E$. In this case a narrow-band luminescence with a relatively long lifetime is observed, because it is a spin-forbidden transition. The spectral position of the transition from $^2E$ to the ground state $^4A_2$ cannot be influenced by the ligand field parameter. But the spectral position can be influenced weakly but significantly by specifically varying Racah parameter B. The Racah parameter B can be influenced by suitably choosing the host lattice. The effective atomic number $Z^{e\!f\!f}$ increases in the isoelectronic $(3d)^3$ ions in the row $Ti^+$, $V^{2+}$, $Cr^{3+}$, $Mn^{4+}$ and $Fe^{5+}$ and leads to a strong shift of all electronic states to higher energies.

A first main advantage of the solution according to the invention is that in a first step a multiplicity of luminescent substances can be selectively produced which differ from the hitherto known authenticity features by the spectral properties. The narrow-band $^2E \rightarrow {}^4A_2$ luminescence can be significantly shifted by specifically varying the host lattice with strong ligand field. The broad-band $^4T_2 \rightarrow {}^4A_2$ luminescence can be strongly shifted in the red and near infrared spectral range by specifically varying the host lattice with weak ligand field.

A second main advantage of the solution according to the invention is that in a second step by combining at least two of such luminescent substances a multiplicity of codings differing from each other can be achieved.

A further advantage of the solution according to the invention is that the excitation spectra of these luminescent substances can be strongly shifted in the visible spectral range.

A further advantage of the solution according to the invention is that combinations of substances luminescent in a narrow-band fashion in zeroth approximation appear like the known ruby authenticity feature and only differ therefrom at well-defined excitation or detection parameters.

A further advantage of the solution according to the invention is that a combination of a known authenticity feature, such as for example the ruby, with at least one of the substances according to the invention in zeroth approximation appears like the known authenticity feature and only differs therefrom at well-defined excitation or detection parameters.

A further advantage of the solution according to the invention is that the substances luminescent in a broad-band fashion only appear at excitation or detection parameters which can distinctly differ from those of the substances luminescent in a narrow-band fashion. This in particular applies to the spectral shape and the lifetime of the luminescences. In particular, the spectral position of the narrow- and broad-band luminescence can be chosen such that they do not overlap each other.

A further advantage of the solution according to the invention is that the host lattices can be chosen such that further ions, which do not have the electron configuration $(nd)^3$, can be incorporated in suitable host lattices and further increase the complexity of the authenticity feature.

In a first advantageous embodiment of the invention at least one substance luminescent in a narrow-band fashion and at least one substance luminescent in a broad-band fashion are combined. The luminescence of the narrow-band substance is based on the spin-forbidden $^2E \rightarrow ^4A_2$ transition of an $(nd)^3$-ions-doped host lattice with strong ligand field. Preferably, the luminescence is in the spectral range of 650-750 nm. As host lattices are suitable pure or mixed compounds with at least one representative from the group of metals of the main groups I, II, transition metals and/or rare earths and at least one representative of the group of non-metals consisting of the main groups III to VII of the periodic system. Especially preferred are host lattices which have a strong ligand field. The luminescence of the substance luminescent in a broad-band fashion is based on the spin-allowed $^4T_2 \rightarrow ^4A_2$ transition of an $(nd)^3$-ions-doped host lattice with weak ligand field. Preferably, the luminescence is in the spectral range of 700-1000 nm. As host lattices are suitable pure or mixed compounds with at least one representative from the group of metals of the main groups I, II, transition metals and/or rare earths and at least one representative of the group of non-metals consisting of the main groups III to VII of the periodic system. Especially preferred are host lattices, which have a weak ligand field.

In a second advantageous embodiment of the invention at least two substances luminescent in a narrow-band fashion are combined. The luminescences are based on the spin-forbidden $^2E \rightarrow ^4A_2$ transition of $(nd)^3$ ions which are doped in a host lattice with strong ligand field. Preferably, the luminescences are in the spectral range of 650-750 nm. As host lattices are suitable pure or mixed compounds with at least one representative from the group of metals of the main groups I, II, transition metals and/or rare earths and at least one representative of the group of non-metals consisting of the main groups III to VII of the periodic system. Especially preferred are host lattices which have a strong ligand field.

Further embodiments and advantages of the invention are explained in the following with reference to the Figures, their descriptions and the examples.

DETAILED DESCRIPTION OF VARIOUS EMBODIMENTS OF THE DISCLOSURE

Figure 1:
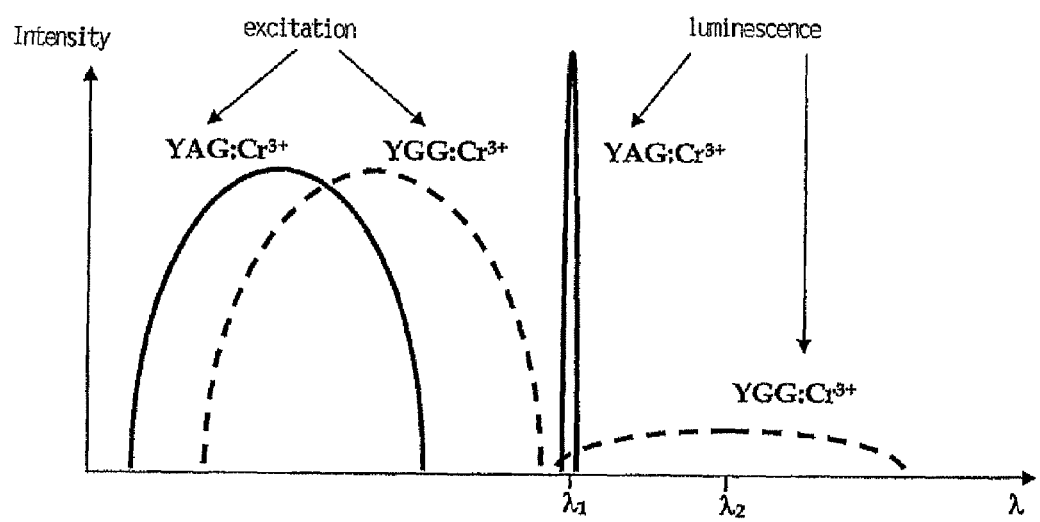
FIG. 1 shows excitation and luminescence spectra of a first embodiment of a substance luminescent in a narrow-band fashion and of a substance luminescent in a broad-band fashion on the basis of two $Cr^{3+}$-doped host lattices.
Figure 2:
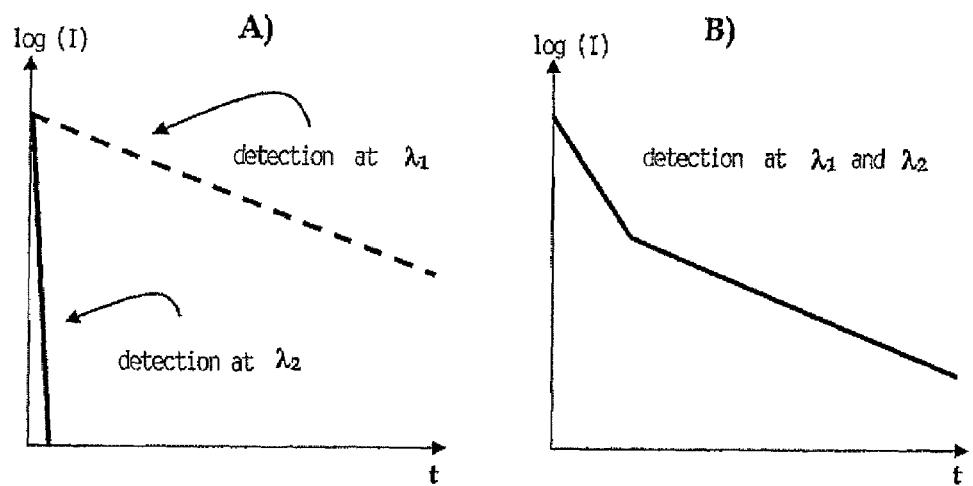
FIG. 2 shows decay curves of the first embodiment of a substance luminescent in a narrow-band fashion and of a substance luminescent in a broad-band fashion on the basis of two $Cr^{3+}$-doped host lattices, wherein A) shows the decay curves at different detection wavelength and B) the decay curve of the combination of the two substances at the same wavelength.

For illustrating the advantages of a first embodiment, as an example a combination of $Cr^{3+}$-doped YAG ($Y_3Al_5O_{12}$) and $Cr^{3+}$-doped YGG ($Y_3Ga_5O_{12}$) is used. The representations in the FIGS. 1 and 2 serve to illustrate this. $Cr^{3+}$ has the $(3d)^3$ electron configuration and luminesces in the YAG with strong ligand field due to the spin-forbidden transition $^2E \rightarrow ^4A_2$ in a narrow-band fashion. In YGG the ligand field is weaker and the spin-allowed $^4T_2 \rightarrow ^4A_2$ luminescence is broad-band, see FIG. 1. The excitation spectra, which follow the $^4T_2 \rightarrow ^4A_2$ absorptions of $Cr^{3+}$, in the two cases are spin-allowed and therefore broad-band. Due to the stronger ligand field in YAG relative to YGG the maximum of the excitation spectrum in YAG lies at shorter wavelength. The decay curves of the two luminescences are shown in FIG. 2. The narrow-band luminescence decays with a distinctly longer lifetime than the broad-band luminescence. This decay periods can be measured either separately or in a combined fashion, see FIG. 2 A) and B). From the combined measurement results a characteristic decay curve, which can be evaluated. A main advantage of this first advantageous embodiment of the solution according to the invention is that the broad-band luminescence is observed only at well-defined detection parameters. With the substance luminescent in a narrow-band fashion the total intensity, represented as area of the luminescence bands, can be measured in a narrow wavelength window. When the same detection parameters are applied to the broad-band luminescence, one obtains only a fraction of the total intensity. A further main advantage is that the critical intensity $I_k$ and the critical time $t_k$ can be defined on the one hand by the choice of the mix ratio of the substance luminescent in a narrow-band and the substance luminescent in a broad-band fashion on a document to be protected and on the other hand by varying the host lattice.

Figure 3:
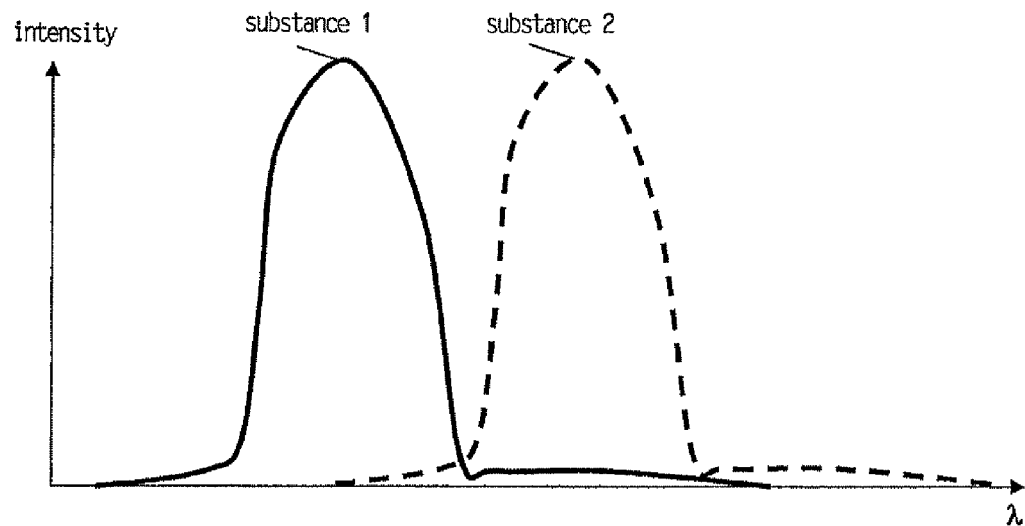
FIG. 3 shows luminescence spectra of a second embodiment on the basis of two $Cr^{3+}$-doped host lattices, which luminesce in a narrow-band fashion.
Figure 4:
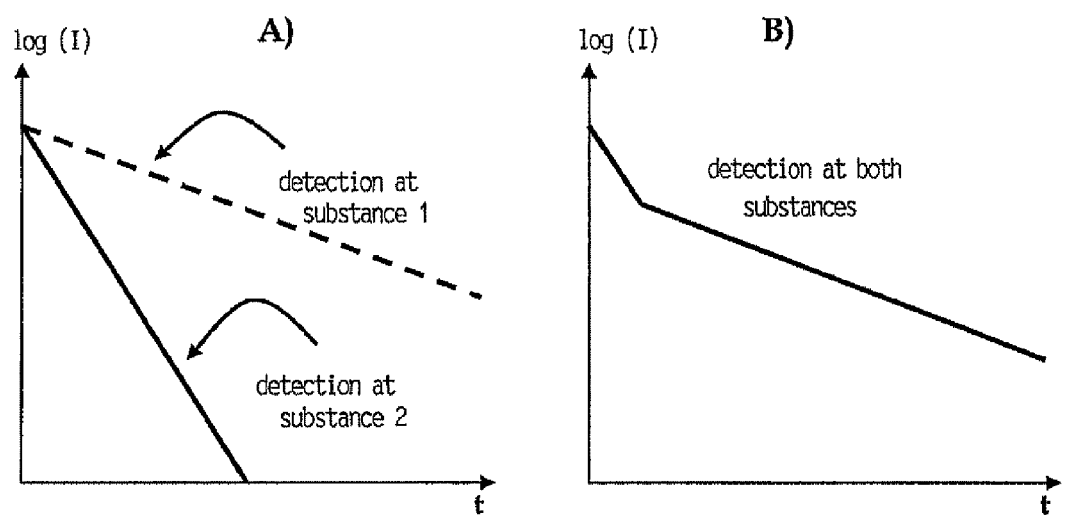
FIG. 4 shows decay curves of the second embodiment on the basis of two $Cr^{3+}$-doped host lattices, which luminesce in a narrow-band fashion, wherein A) shows the decay curves at different detection wavelength and B) the decay curve of the combination of the two substances at the same wavelength.

For illustrating the advantages of a second embodiment, as an example a combination of $Cr^{3+}$-doped YAG ($Y_3Al_5O_{12}$) and $Cr^{3+}$-doped YAP (YAlO$_3$) is used. The representations in the FIGS. 3 and 4 serve to illustrate this. $Cr^{3+}$ has the $(3d)^3$ electron configuration and luminesces in YAG and YAP, which both have a strong ligand field, in a narrow-band fashion which is due to the spin-forbidden transition $^2E \rightarrow ^4A_2$. The different Racah parameter B of the $Cr^{3+}$ ions in these two different host lattices are responsible for the main band in YAG being shifted in relation to that with YAP, see FIG. 3. The decay curves of the luminescence of the $Cr^{3+}$ ions are also different in these two host lattices and are shown in FIG. 4. These can be measured at well-defined detection parameters in a separate fashion, see FIG. 4 A), or in a combined fashion, see FIG. 4 B). A main advantage of this second advantageous embodiment of the solution according to the invention is that this combination of two authenticity features in zeroth approximation appears like the known ruby feature or simply as a luminescence in the red spectral range. Not until with well-defined detection parameters two bands will appear.

By the combination with further substances luminescent in a narrow-band and/or broad-band fashion there are opened numerous possibilities for influencing the luminescence properties of the luminescent authenticity features and thus to produce a multiplicity of different authenticity features.

The authenticity features according to the invention can also be combined with known authenticity features, which leads to a still greater variety.

Beside the evaluation of the luminescence spectra, likewise, the lifetime of luminescence can be used for the differentiation. When evaluating besides the energy of the luminescence lines also their number and/or shape and/or their intensities can be taken into account, with which any coding can be represented.

Likewise, it is possible to incorporate further additional ions such as other transition metal ions or rare earth metal ions in at least one of the luminescent substances of the authenticity feature and thus to achieve a combined luminescence of the different ions or an energy transfer between the two ions in the same substance.

Here the marking can be effected either at different places of the document of value or at the same place. When the mark is applied or incorporated at different places of the document of value, in this way a spatial code, in the simplest case for example a bar code, can be produced.

Furthermore, the forgery-proofness of the document of value can be increased, when the luminescent authenticity feature for example in a document of value is associated with other pieces of information of the document of value, so that a test by means of a suitable algorithm is possible.

It is obvious that the document of value besides the luminescent authenticity features according to the invention can contain still further additional authenticity features, which are based on classical luminescence and/or magnetism. In particular, a luminescence which is excited in the ultraviolet and emits to red.

According to the invention the luminescent authenticity features can be incorporated in the document of value in most different ways. For example, the authenticity features can be incorporated in a printing ink. But admixing the authenticity features to the paper pulp or plastic mass when producing a document of value on the basis of paper or plastic is also possible. Likewise, the authenticity features can be provided on or in a plastic carrier material, which for example in turn can be incorporated at least partially in the paper pulp. The carrier material, which is based on a suitable polymer, such as for example PMMA, and in which the authenticity features according to the invention are embedded, here can have the form of a security thread, a mottling fiber or a planchet. Likewise, for the product protection the authenticity features can be incorporated for example directly in the material of the object to be protected, for example in housings and plastic bottles.

But the plastic carrier material or paper carrier material can also be attached to any other object, for example for the purpose of product protection. In this case the carrier material preferably has the form of a label. Wenn the carrier material forms a component of the product to be protected, as it is the case for example with tear threads, obviously, any other design is possible. In certain cases of application it can be expedient to provide the authenticity feature as an invisible mixture as a coating on the document of value. It can be there completely all-over or also in the form of certain patterns, such as for example stripes, lines, circles or in the form of alphanumeric characters. So as to ensure the invisibility of the authenticity feature, according to the invention either a colorless luminescent substance must be used in the printing ink or the coating lacquer or a colored luminescent substance in such a low concentration that the transparency of the coating is only just given. Alternatively or additionally, the carrier material can be dyed in a suitable fashion, so that colored luminescent substances cannot be perceived because of their color.

Usually, the authenticity features according to the invention are processed in the form of pigments. For a better processing or for increasing their stability the pigments can be present in particular as individually encapsulated pigment particles or be covered with an inorganic material or organic coating. For this purpose, for example, the individual pigment particles are enclosed with a silicate envelope and thus can be easier dispersed in media. Likewise, different pigment particles of a combination can be jointly encapsulated, for example in fibers, threads, silicate envelopes etc. Thus, for example, it is no longer possible to change the "code" of the combination. "Encapsulating" here means a complete enveloping of the pigment particles, while "coating" also means the partial enveloping or coating of the pigment particles.

In the following, some examples for the synthesis of the oxidic materials according to the invention are listed:

EXAMPLE 1

Producing Chromium-activated Yttrium Garnet (Cr: $Y_3Al_5O_{12}$)

42.82 g aluminum oxide ($Al_2O_3$), 0.15 g chromium oxide ($Cr_2O_3$), 57.03 g yttrium oxide ($Y_2O_3$) are weighed and together with 100 g dehydrated sodium sulphate ($Na_2SO_4$) homogeneously mixed. The mixture is filled in corundum crucibles and is heated at a temperature of 1150° C. for a period of 12 hours. After cooling the resulting reaction product is comminuted and in the water bath rests of the flux are cleaned off. If necessary, rests of the employed chromium oxide or by-products resulting therefrom, e.g. sodium chromate, can be reduced to chromium(III) by sulphuric acid/iron sulphate and be separated. The resulting product is filtered out and dried at 100° C.

EXAMPLE 2

Producing Chromium-activated Yttrium-perovskite ($Cr:YAlO_3$)

31.04 g aluminum oxide ($Al_2O_3$), 0.09 g chromium oxide ($Cr_2O_3$), 68.87 g yttrium oxide ($Y_2O_3$) are weighed and together with 100 g dehydrated sodium sulphate ($Na_2SO_4$) homogeneously mixed. The mixture is filed in corundum crucibles and is heated at a temperature of 1150° C. for a period of 18 hours. After cooling the resulting reaction product is comminuted and in the water bath rests of the flux are cleaned off. If necessary, rests of the employed chromium oxide or by-products resulting therefrom, e.g. sodium chromate, can be reduced to chromium(III) by sulphuric acid/iron sulphate and be separated. The resulting product is filtered out and dried at 100° C. If desired, the material can be grinded to the desired particle size by grinding.

Figure 5:
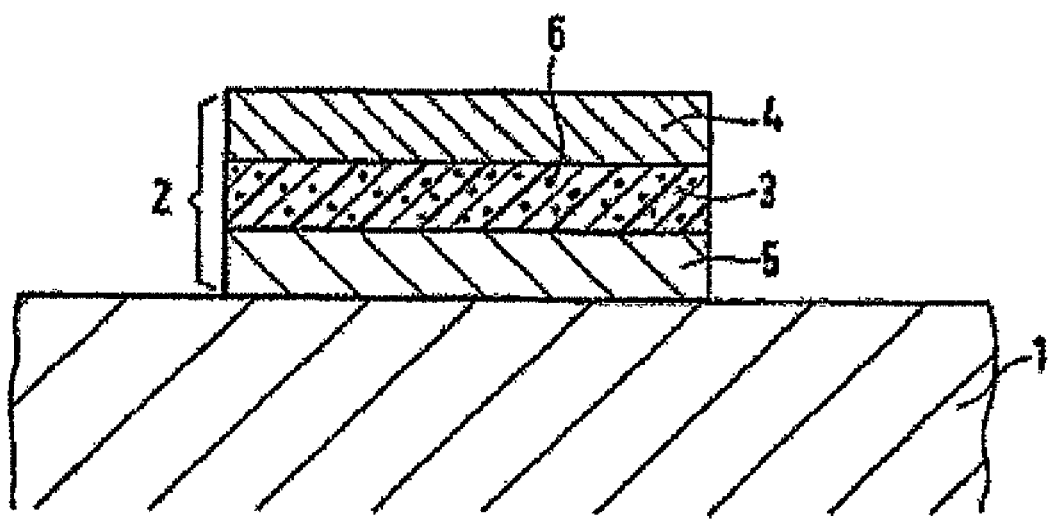
FIG. 5 shows a cross section of a security element according to the invention.

FIG. 5 shows an embodiment of the security element according to the invention. In this case the security element is made of a label 2, which is composed of a paper or plastic layer 3, a transparent cover layer 4, as well as an adhesive layer 5. This label 2 is connected with any desired substrate 1 via adhesive layer 5. This substrate 1 can be documents of value, ID documents, passports, deeds or the like but also other objects to be protected, such as for example CDs, packagings or the like. In this embodiment, luminescent authenticity feature 6 is contained in the volume of layer 3.

Alternatively, the luminescent authenticity feature can be contained in a not shown printing ink, which is printed onto one of the label layers, preferably onto the surfaces of layer 3.

Instead of providing the luminescent authenticity feature in or on a carrier material, which subsequently is attached as a security element to an object, according to the invention it is also possible to provide the luminescent authenticity feature directly in the document of value to be protected or on its surface in the form of a coating.

The invention claimed is:

1. An authenticity feature comprising at least two luminescent substances, each luminescent substance having at least one host lattice, wherein the host lattices of the at least two luminescent substances define a plurality of host lattices doped with doping ions, wherein the doping ions have a $(3d)^3$ electron configuration and are configured as activators to emit luminescence.

2. The authenticity feature according to claim 1, wherein the host lattices have a strong and/or a weak ligand field.

3. The authenticity feature according to claim 1, wherein the doping ions are titanium in the oxidation state 1 or vanadium in the oxidation state 2 or chromium in the oxidation state 3 or manganese in the oxidation state 4 or iron in the oxidation state 5.

4. The authenticity feature according to claim 1, wherein the host lattices are pure or mixed compounds with at least one representative from the group of the metals of the main groups I, II, transition metals and/or rare earths and at least one representative from the main groups III to VII of the periodic system of elements.

5. The authenticity feature according to claim 1, wherein at least one of the host lattices additionally is doped with at least one representative from the group of the rare earth metals.

6. The authenticity feature according to claim 1, wherein the authenticity feature is present in the form of pigment particles.

7. The authenticity feature according to claim 1, wherein the authenticity feature is combined with at least one different authenticity feature.

8. The authenticity feature according to claim 1, wherein the authenticity feature is admixed with a printing ink.

9. A document of value comprising an authenticity feature according to claim 1, wherein the document of value is made of paper or plastic material.

10. The document of value according to claim 9, wherein the authenticity feature is incorporated in the volume of the document of value and/or is present in one of the layers applied onto the document of value.

11. The document of value according to claim 9, wherein the authenticity feature is an invisible, at least partial coating on the document of value.

12. A security element, comprising a carrier element and at least one authenticity feature according to claim 1, wherein the authenticity feature is embedded in the carrier material and/or is applied on the carrier material.

13. The security element according to claim 12, wherein the security element is in the form of a strip or band.

14. The security element according to claim 12, wherein the carrier material is formed as a security thread, planchet or mottling fiber.

15. The security element according to claim 12, wherein the security element is formed as a label.

16. A method for producing a document of value as recited in claim 9, wherein the authenticity feature is added to a printing ink.

17. A method for producing a document of value as recited in claim 9, wherein the authenticity feature is applied by a coating process.

18. A method for producing a document of value as recited in claim 9, wherein the security feature is incorporated in the volume of the document of value.

19. A method for producing a document of value as recited in claim 9, wherein the authenticity feature is supplied to the document of value by means of mottling fibers.

20. A method for producing a document of value as recited in claim 9, wherein the authenticity feature is supplied to the document of value and/or the security element by means of a security thread.

21. A test method for authenticity testing an authenticity feature as recited in claim 1, wherein at least one property of the authenticity feature is evaluated.

22. The test method according to claim 21, wherein wavelengths and/or number and/or the shape and/or the intensities of the emission lines of the authenticity feature are evaluated.

23. The test method according to claim 21, wherein the luminescence decay curves of the authenticity feature are evaluated.

24. The test method according to claim 21, wherein the evaluation is effected at different temperatures.

25. The test method according to claim 21, wherein during evaluation a spatial distribution of the authenticity feature is tested.

* * * * *